United States Patent [19]

Dickert, Jr. et al.

[11] Patent Number: 4,608,182
[45] Date of Patent: Aug. 26, 1986

[54] VINYL SULFONATE AMIDE COPOLYMER AND TERPOLYMER COMBINATIONS FOR CONTROL OF FILTRATION IN WATER-BASED DRILLING FLUIDS AT HIGH TEMPERATURE

[75] Inventors: Joseph J. Dickert, Jr., Yardley, Pa.; Israel J. Heilweil, Princeton, N.J.

[73] Assignee: Mobil Oil Corporation, New York, N.Y.

[21] Appl. No.: 690,066

[22] Filed: Jan. 9, 1985

[51] Int. Cl.$^4$ ............................................. C09K 7/02
[52] U.S. Cl. ................................. 252/8.512; 252/8.514
[58] Field of Search ........................ 252/8.5 C, 8.5 A

[56] References Cited

U.S. PATENT DOCUMENTS

| | | |
|---|---|---|
| 4,172,800 | 10/1979 | Walker . |
| 4,201,678 | 5/1980 | Pye et al. . |
| 4,309,523 | 1/1982 | Engelhardt et al. . |
| 4,440,649 | 4/1984 | Loftin et al. . |
| 4,478,727 | 10/1984 | Turner et al. . |

OTHER PUBLICATIONS

George R. Gray and H. C. H. Darley, *Composition and Properties of Oil Well Drilling Fluids*, 4th Edition, Gulf Publishing Co., Houston, 1980, p. 20.

Royal E. Loftin, Adelina J. Son, T. M. Ballard, "Temperature-Stable Polymeric Fluid-Loss Reducer Tolerant to High Electrolyte Contamination," 59th Annual Conference and Exhibition, Houston, Sep. 16-19, 1984, Society of Petroleum Engineers of AIME (SPE 13160).

*Primary Examiner*—Herbert B. Guynn

*Attorney, Agent, or Firm*—Alexander J. McKillop; Michael G. Gilman; Charles J. Speciale

[57] ABSTRACT

A water-based clay drilling fluid or mud suitable for drilling at temperatures up to 200° C. and pressures up to 100 psig at pH levels from 8 to 11.5, said mud or fluid containing additives which are two separate and distinct water-soluble vinyl sulfonate amide polymers. One polymer consists of a random distribution of units of the formulae (a)

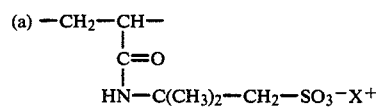

(b) 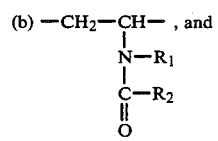 , and (c)

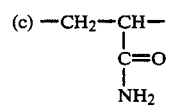

The other polymer consists of a random distribution of units of the formula (a) and (b) as described above. In each polymer, $R_1$ and $R_2$ are the same or different and each is hydrogen, methyl, or ethyl, and $X^+$ is a cation.

Drilling while using this improved fluid or mud results in a reduced fluid loss rate.

2 Claims, No Drawings

VINYL SULFONATE AMIDE COPOLYMER AND TERPOLYMER COMBINATIONS FOR CONTROL OF FILTRATION IN WATER-BASED DRILLING FLUIDS AT HIGH TEMPERATURE

BACKGROUND OF THE INVENTION

This invention relates to improvements in aqueous clay-based drilling fluids which better enable drilling at high temperatures by decreasing fluid loss. Aqueous clay-based drilling fluids or muds are well-known in the prior art, as are different additives. Such fluids are comprised basically of water, a clay such as bentonite or sepiolite, lignosulfonate, a base such as NaOH, a densifier such as barite, or barium sulfate and possibly a salt containing a cation such as sodium or potassium. Other aqueous ionic compounds such as $Na^+Cl^-$ may also be present. These fluids are suitable for drilling at pH levels from about 8 to about 11.5.

As drilling temperatures in recent years have been increasing, the prior art has searched for additives to conventional drilling fluids to facilitate drilling at higher temperatures. One major problem some of these additives have tried to alleviate has been an increased fluid loss due to high-temperature drilling. U.S. Pat. No. 4,172,800, issued to Walker, discloses an additive mixture of a polyethoxylated sulfurized fatty acid and a polyalkylene glycol. U.S. Pat. No. 4,201,678, issued to Pye et al, discloses a foaming solution suitable for drilling at up to 700° F., containing an amphoteric betaine, a salt of a linear aliphatic or alkyl aryl hydrocarbon sulfonate, and, optionally, an unneutralized ammonia. U.S.S.R. Patent 883,140, issued to Boreholes Consolidated, discloses a drilling fluid containing a lignosulfonate, an acrylic polymer, potash alum, potassium hydroxide, and water. This fluid is used at temperatures up to 200° C. and at pH levels from 8 to 12.9. U.S. Pat. No. 4,478,727, issued to Turner et al, discloses an additive consisting of a copolymer of sodium styrene sulfonate-co-sodium-N-(4-sulfophenyl)-maleimide.

Another additive which has been used in drilling fluids is a sulfonate amide copolymer. U.S. Pat. No. 4,309,523 to Engelhardt et al discloses copolymers consisting essentially of a random distribution of (a) 5 to 95% by weight of units of the formulae

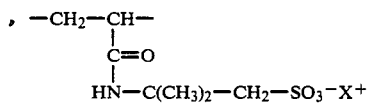

(b) 5 to 95% by weight of units of the formula

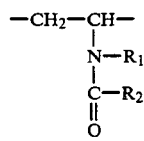

and (c) 0 to 80% by weight of units of the formula

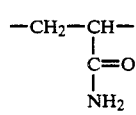

wherein $R_1$ and $R_2$ are the same or different and each is hydrogen, methyl, or ethyl, and $X^+$ is a cation. The terpolymer composition of the Engelhardt patent has been used in a drilling fluid as disclosed in U.S. Pat. No. 4,440,649 to Loftin et al. Loftin discloses the use of the composition in the Engelhardt patent as a fluid loss reducing and rheology stabilizing agent, either alone or in combination with pregelatinized starch and/or hydroxyethylcellulose. Loftin also uses organic cationic clay-stabilizing agents as well as water and a viscosity increasing agent. Loftin ages his fluids at temperatures up to 350° F. The fluid loss experiments disclosed in the Loftin reference are standard API fluid loss experiments carried out at room temperature. This test, as described in Gray and Darley, *Composition and Properties of Oil Well Drilling Fluids* (1980), pg. 20, subjects the mud to static filtrations for 30 minutes, after which the volume of filtrate is measured through filter paper R. E. Loftin, A. J. Son, and T. M. Ballard describe the use of a drilling fluid containing a vinylamide/vinylsulfonate polymer at temperatures in excess of 400° F. in "Temperature-Stable Polymeric Fluid-Loss Reducer Tolerant to High Electrolyte Contamination," a paper presented at the 59th Annual Technical Conference and Exhibition at Houston, Tex., on Sept. 16–19, 1984. The paper was published by the Society of Petroleum Engineers of AIME and is referred to as SPE 13160. The fluid loss tests, however, as in the Loftin patent, are API fluid loss tests done at room temperature and not at the drilling temperatures of 400° F. (about 200° C.) and above.

Problems encountered in the prior art include increased fluid loss at high temperatures and/or the decomposition of some drilling fluid additives at high temperatures. The object of the present invention is to alleviate both of these problems with a new additive system for drilling fluids.

SUMMARY OF THE INVENTION

The compositions of the invention consist essentially of a water-based clay drilling fluid to which has been added two separate and distinct water-soluble vinyl sulfonate amide polymers. One polymer, a terpolymer, consists essentially of a random distribution of units of the formulae (a)

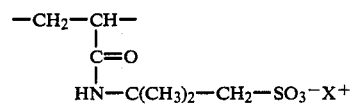

in an amount from 5 to 95 wt. %, (b)

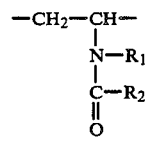

in an amount from 5 to 95 wt %, and (c)

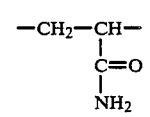

in an amount greater than zero, but up to 80 wt. %.

The second polymer, a copolymer, consists essentially of only units (a) and (b) as described above. In both copolymers, $R_1$ and $R_2$ are the same or different, and each is hydrogen, methyl or ethyl, and $X^+$ is a cation. Drilling conditions can be at temperatures up to about 200° C., and at pH levels from 8 to 11.5. Pressures range from atmospheric up to about 100 psi.

DETAILED DESCRIPTION OF THE INVENTION

It is therefore the object of the present invention to provide a stable drilling fluid at temperatures up to 200° C. which also reduces fluid loss. The invention consists essentially of a water-based clay drilling fluid containing two separate and distinct water-soluble vinyl sulfonate amide polymers. Polymer 1, a terpolymer, consists essentially of a random distribution of units of the formulae (a)

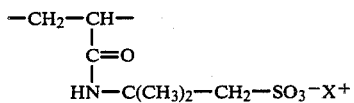

(b)

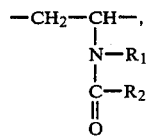

and (c)

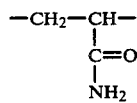

Polymer 2, the copolymer consists only of a random distribution of units (a) and (b). For polymer 1, the terpolymer, a preferred composition of the additive consists of from 5 wt. % to 95 wt. % water-soluble 2-acrylamido-2-methyl-propane-3-sulfonic acid (AMPS), or unit (a), more preferably from 35 wt. % to 70 wt. %, from 5 wt. % to 95 wt. % N-vinyl-N-methylacetamide, or unit (b), preferably from 15 wt. % to 35 wt. %, and from greater than zero up to 80 wt. % of acrylamide, or unit (c), preferably from 10 wt. % to 30 wt. %. A preferred composition for polymer 2 is from 5 wt. % to 95 wt. % water-soluble 2-acrylamido-2-methyl-propane-3-sulfonic acid (AMPS), or unit (a), more preferably from 60 wt. % to 80 wt. %, and from 5 wt. % to 95 wt. % N-vinyl-N-methylacetamide, or unit (b), more preferably from 20 wt. % to 40 wt. %. A preferred embodiment of polymer 1 is HOE-2825, and a preferred embodiment of polymer 2 is HOE-3118. In each polymer, $R_1$ and $R_2$ are the same or different and each is hydrogen, methyl, or ethyl, and $X^+$ is a cation. The polymers each have a molecular weight from about 1,000,000 to 2,000,000.

The two polymers in the preferred composition can be prepared by dissolving 2-acrylamido-2-methyl-propane-3-sulfonic acid in water, and then neutralizing this acid with a base of the formula

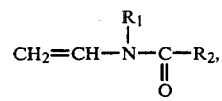

wherein $R_1$ and $R_2$ are the same or different and denote hydrogen, methyl, or ethyl. In polymer 1, acrylamide is added, while in polymer 2, it is not. The process of making these copolymers is more fully described in U.S. Pat. No. 4,309,523, which is incorporated by reference.

The base fluid of the present invention is well known and is a water-based clay containing sea salt and inert densifiers. In the preferred embodiment, the water-based clay contains water, a clay mix, aquagel, which is a bentonite-based drilling clay, NaOH, sea salt, and Barite, which is an inert densifier known as $BaSO_4$. The density of this fluid is 11.8 lbs./gal.

To this base fluid is added the combination of vinyl sulfonate amide polymer additives of the present invention. Each additive can be present in an amount of about 0.25 to 6 lbs./bbl. of drilling fluid, or 0.07 to 1.67 wt. % of drilling fluid. This results in a total concentration of additive from about 0.5 to 12 lbs./bbl., or about 0.14 to 3.33 wt. %. More preferred concentrations for each polymer are from 0.5 to 5 lbs./bbl., or 0.14 to 1.39 wt. %.

Drilling operations utilizing the composition of the present invention can be carried out at a preferred pH range from 8 to 11.5. Before the drilling fluid is used, it is preferably aged at temperatures of about 200° C., for a time period of about 16 hours. An object of the invention is to carry out drilling operations at high temperatures and the present compositions have been demonstrated at drilling temperatures up to 200° C. The following examples and tables show the preparation and use of the the compositions of the invention. The compositions remain stable at high drilling temperatures while, at the same time, preventing excessive fluid loss.

EXAMPLE 1

A water-based clay drilling fluid is prepared as follows:

5,600 ml $H_2O$, 90 g of Aquagel ™ clay prepared from bentonite, and 540 g of a clay mix were stirred in a mechanical mixer at 8,500–9,000 rpm, and then allowed to age for about 48 hours. NaOH was then added to give the mixture a pH of 9.95. 75.4 g of "synthetic sea salt" (8,000 ppm $Cl^-$), 3,000 g of Barite, which is a barium sulfite densifying agent, and 2.5 ml of 36% NaOH to give a pH of 9.9 were then added. The density of the mixture was 11.8 lb./gal.

For the examples which follow, the test apparatus used is a modified N. L. Baroid filter apparatus. The apparatus is comprised of a filter column surrounded by a heating jacket. The drilling fluid is placed in a reservoir leading to the filter column. The fluid is then passed through a filter resting on a screen support. When a valve is opened at various intervals, the fluid flows into a receiver and the fluid loss can then be measured.

For filtrations at high temperatures, the filter column was pressured to up to 400 psi and the receiver up to 300 psi, resulting in a $\Delta p$ value of up to about 100 psi.

In the preferred embodiment used in the following examples, the filter is two "specially hardened" Baroid No. 988 filter papers, and the screen support is a 60μ stainless steel filter disc. The filtration area is 21 cm².

EXAMPLE 2

The drilling fluid as prepared in Example 1 was aged for 16 hours at 200° C. A mixture of 200 ml of drilling fluid and 10 ml H₂O was placed in the filter apparatus. Pressure difference (Δp) in the filter appartus was 100 psi. The experiment was run at a drilling temperature of 200° C. Fluid loss measured as a function of time is shown in Table 1 below.

TABLE 1

| Time (min.) | Vol. (ml) | Time/Volume |
| --- | --- | --- |
| 0.5 | 5.0 | .10 |
| 1 | 7.8 | .13 |
| 2 | 10.8 | .19 |
| 3 | 13.5 | .22 |
| 4 | 15.8 | .25 |
| 6 | 20.0 | .30 |
| 8 | 23.3 | .34 |
| 10 | 26.2 | .38 |
| 12 | 29.0 | .41 |
| 15 | 33.2 | .45 |
| 20 | 41.0 | .49 |
| 25 | 49.0 | .51 |
| 30 | 55.0 | .55 |
| 35 | 63.0 | .56 |

EXAMPLES 3-6

These examples show various concentrations of polymers 1 and/or 2 added to 12.5 ml of water and 250 ml of the drilling fluid as prepared in Example 1. This fluid was aged in each case at 200° C. for 16 hours. It was then placed in the filter apparatus at 200° C. and Δp of 100 psi. The volume of fluid loss in each example as a function of time is shown in Table 2.

TABLE 2

| Example | System | Conc. lbs./bbl. | Flow (ml) 4 min. | 8 min. | 15 min. | 30 min. |
| --- | --- | --- | --- | --- | --- | --- |
| 3 | polymer 1* | 4 | 9.6 | 13.3 | 17.5 | 23.5 |
| 4 | polymer 2** | 4 | 7.1 | 9.9 | 13.7 | 19.8 |
| 5 | polymer 1 polymer 2 | 2 2 | 8.00 | 12.0 | 16.8 | 23.0 |
| 6 | polymer 1 polymer 2 | 3 1 | 12.5 | 17.6 | 22.5 | 29.3*** |

*HOE 2825 (41% AMPS, 31% N—vinyl-N—methylacetamide, 27% acrylamide)
**HOE 3118 (62% AMPS, 38% N—vinyl-N—methylacetamide)
***at 31 min.

EXAMPLE 7

A concentration of polymer 1* at 1 lb./bbl. (0.713 g) and a concentration of polymer 2** at 3 lbs./bbl. (2.14 g) were added, along with 12.5 ml of water, to 250 ml of the drilling fluid as prepared in Example 1. This fluid was then aged at 200° C. for 16 hours. It was then placed in the filter apparatus at 200° C. and Δp of 100 psi. The volume of fluid loss as a function of time is shown in Table 3.

TABLE 3

| Time (min.) | Vol. (ml) | Time/Volume |
| --- | --- | --- |
| 0.5 | 2.4 | .21 |
| 1 | 3.5 | .29 |
| 3 | 4.8 | .42 |
| 4 | 6.3 | .63 |
| 6 | 7.7 | .78 |
| 8 | 8.7 | .92 |
| 10 | 9.8 | 1.02 |
| 12 | 11.0 | 1.09 |
| 15 | 11.7 | 1.28 |
| 20 | 13.5 | 1.48 |
| 25 | 15.3 | 1.63 |
| 30 | 16.8 | 1.79 |
| 35 | 17.7 | 1.98 |

*HOE 2825
**HOE 3118

These test results show the superiority of a combination of polymers 1 and 2 as a drilling mud additive, as opposed to using either polymer 1 or polymer 2 as in the prior art. This combination has superior stability properties and can be used in drilling operations at temperatures up to about 200° C.

Polymers 1 and 2, alone or in combination, have been further found to provide good fluid loss reducing agents when used in conjunction with materials such as acrylate polymers, acrylate propylene glycol copolymers, and sulfonate amide copolymers different from those heretofore disclosed.

What is claimed is:

1. A water-based clay drilling fluid containing from 0.25 lbs./bbl. to 6 lbs./bbl. of (A) a water-soluble first polymer consisting of a vinyl sulfonate amide terpolymer having a molecular weight of about 1 million to 2 million and consisting of a random distribution of units of the formulae (a)

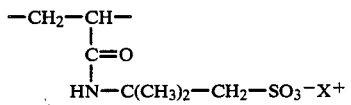

in a proportion of 35 wt. % to 70 wt. % of the weight of the terpolymer, (b)

(a)

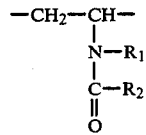

in a proportion of 15 wt. % to 35 wt. % of the weight of the terpolymer, and (c)

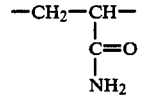

in a proportion of 10 wt. % to 30 wt. % of the weight of the terpolymer, wherein $R_1$ and $R_2$ are the same or different and each is hydrogen, methyl, or ethyl, and $X^+$ is a cation, and (B) from 0.25 lbs./bbl. to 6 lbs./bbl. of a water-soluble second polymer consisting of a vinyl sulfonate amide copolymer having a molecular weight of about 1 million to 2 million and consisting of a random distribution of units of the formulae (a)

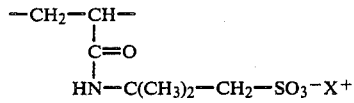

in a proportion of 60 wt. % to 80 wt. % of the weight of the copolymer, and (b)

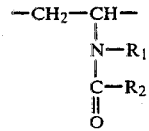

in a proportion of 20 wt. % to 40 wt. % of the weight of the copolymer, wherein $R_1$ and $R_2$ are the same or different and each is hydrogen, methyl, or ethyl and $X^+$ is a cation and wherein the weight ratio of said terpolymer to said copolymer is about 1:3.

2. In a method of drilling a well at a pressure up to about 100 psi, and a temperature up to about 200° C. comprising circulating a drilling fluid in the well while drilling, the improvement of employing as said drilling fluid a drilling fluid of a pH level from 8 to 11.5 and having the composition of claim 1.

* * * * *

UNITED STATES PATENT AND TRADEMARK OFFICE
CERTIFICATE OF CORRECTION

PATENT NO. : 4,608,182

DATED : August 26, 1986

INVENTOR(S) : J.J. Dickert, Jr., and I.J. Heilweil

It is certified that error appears in the above-identified patent and that said Letters Patent is hereby corrected as shown below:

Column 3, line 53, after "AMPS" insert --- ® (a Federally registered trademark of The Lubrizol Corporation)---

Column 5, lines 47 and 48, after "AMPS" insert --- ® (a Federally registered trademark of The Lubrizol Corporation)---

Signed and Sealed this

Third Day of March, 1987

Attest:

Attesting Officer

DONALD J. QUIGG

Commissioner of Patents and Trademarks